United States Patent
Haas et al.

(10) Patent No.: US 8,857,468 B2
(45) Date of Patent: Oct. 14, 2014

(54) EXPANSION RESERVOIR FOR A COOLANT CIRCUIT

(75) Inventors: Uwe Haas, Stammham (DE); Thomas Anzenberger, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/814,668

(22) PCT Filed: Jul. 15, 2011

(86) PCT No.: PCT/EP2011/003528
§ 371 (c)(1),
(2), (4) Date: Feb. 6, 2013

(87) PCT Pub. No.: WO2012/019686
PCT Pub. Date: Feb. 16, 2012

(65) Prior Publication Data
US 2013/0139903 A1 Jun. 6, 2013

(30) Foreign Application Priority Data
Aug. 7, 2010 (DE) .......................... 10 2010 033 715

(51) Int. Cl.
*F01P 11/02* (2006.01)
*F01P 11/18* (2006.01)
*B65D 51/16* (2006.01)
*F16K 24/04* (2006.01)

(52) U.S. Cl.
CPC ............... *F16K 24/04* (2013.01); *F01P 11/029* (2013.01); *F01P 11/0238* (2013.01)
USPC .................. 137/625.12; 137/587; 137/516.27; 123/41.54; 165/104.32

(58) Field of Classification Search
CPC .... F16K 17/196; F16K 24/04; F01P 11/0247; F01P 11/029; F01P 11/0238
USPC ............. 137/587, 516.27, 625.12; 123/41.15, 123/41.54; 165/104.32; 62/434
See application file for complete search history.

(56) References Cited

U.S. PATENT DOCUMENTS

| 3,077,927 | A |   | 2/1963 | White et al. |
| 3,820,593 | A | * | 6/1974 | Pabst .............................. 165/51 |
| 4,510,893 | A |   | 4/1985 | Schweiger et al. |
| 4,511,056 | A |   | 4/1985 | Reutter |
| 5,135,049 | A |   | 8/1992 | Attinger et al. |

(Continued)

FOREIGN PATENT DOCUMENTS

| DE | 1 097 761 |    | 1/1961 |
| DE | 31 50 231 | A1 | 6/1983 |

(Continued)

OTHER PUBLICATIONS

International Search Report issued by the European Patent Office in International Application PCT/EP2011/003528.

*Primary Examiner* — Atif Chaudry
(74) *Attorney, Agent, or Firm* — Henry M. Feiereisen LLC

(57) ABSTRACT

Expansion reservoir (1) for a coolant circuit, having a fill opening (3) that can be closed by a lid (2) and is located in the geodetically upper region of the expansion reservoir (1), wherein a differential-pressure-controlled valve (4) having at least two switching positions is integrated into the lid (2), and having at least one inlet port (5) which opens into a lid region (10), and an outlet port (6) in the geodetically lower region of the expansion reservoir (1), wherein the inlet port (5) is closed by the valve (4) in a first switching position and is opened in at least one second switching position, thus allowing the inlet port (5) to vent into the expansion reservoir (1).

6 Claims, 1 Drawing Sheet

(56) References Cited

U.S. PATENT DOCUMENTS 5,836,269 A 11/1998 Schneider
6,390,318 B1 5/2002 Tanaka et al.

FOREIGN PATENT DOCUMENTS

| | | |
|---|---|---|
| DE | 32 26 508 | 1/1984 |
| DE | 40 25 067 C1 | 7/1991 |
| DE | 40 39 993 A1 | 3/1992 |
| DE | 196 07 638 C1 | 6/1997 |
| DE | 100 33 953 A1 | 2/2001 |
| DE | 199 48 160 A1 | 4/2001 |
| EP | 0 160 761 | 11/1985 |
| GB | 1 488 512 | 10/1977 |
| JP | 61 029021 U | 2/1986 |

* cited by examiner

EXPANSION RESERVOIR FOR A COOLANT CIRCUIT

CROSS-REFERENCE TO RELATED APPLICATIONS

This application is the U.S. National Stage of International Application No. PCT/EP2011/003528, filed Jul. 15, 2011, which designated the United States and has been published as International Publication No. WO 2012/019686 and which claims the priority of German Patent Applications, Serial No. 10 2010 033 715.3, filed Aug. 7, 2010, pursuant to 35 U.S.C. 119(a)-(d).

BACKGROUND OF THE INVENTION

Expansion reservoir for a coolant circuit, having at least one inlet port and an outlet port, and a fill opening that can be closed by a lid, wherein a differential-pressure-controlled valve with at least two switching positions is integrated in the lid.

Such expansion reservoirs are employed in coolant circuits of internal combustion engines, in particular for motor vehicles, for separating air from the coolant circuit, for compensating for the increase in volume of the cooling medium being heated, for filling the coolant circuit and for building up a positive pressure to prevent the coolant from boiling.

DE 40 39 993 A1 discloses a vent line in the cooling circuit of an internal combustion engine, wherein the vent line connects a radiator located in an upper portion of the expansion reservoir and having a ceiling higher than the expansion reservoir. The expansion reservoir has in the ceiling a filler neck sealable by a lid, wherein the lid includes a pressure relief valve. A tubular element of the vent line dips into the expansion reservoir at the upper portion and has an opening in the vicinity of the reservoir bottom. The tubular element has in the region of its highest point in the expansion reservoir a port that is open to the atmosphere, wherein the port is formed by closed space in the filler neck that is closed towards the interior space of the expansion reservoir, which is closed off to the atmosphere when the filler neck is closed. The air that is displaced when the expansion reservoir and the radiator are filled can then escape via the open space through the filler neck. During the driving operation, the air is forced via the space to the lid when the filler neck is closed, wherein the lid is raised when a pressure that depends on the type of the lid is exceeded, thereby allowing the expansion reservoir to be vented to the atmosphere.

Disadvantageously, the that the vent line of such an expansion reservoir cannot be reliably closed during warm-up of the cooling circuit, so that unwanted heat may be introduced from the cooling circuit into the expansion reservoir. Furthermore, the expansion reservoir is unsuitable for cooling circuits that are continuously operating under overpressure, because venting to the atmosphere occurs from a certain pressure threshold on, causing the overpressure to decrease.

SUMMARY OF THE INVENTION

It is therefore an object of the present invention to provide an expansion reservoir for a coolant circuit operated under overpressure, which enables the coolant to be heated as fast as possible.

Expansion reservoir for a coolant circuit, including a fill opening that is located in the geodetically upper region of the expansion reservoir and closable by a lid, wherein a differential-pressure-controlled valve with at least two switching positions is integrated in the lid, and including at least one inlet port extending to a lid portion and an outlet port in the geodetically lower area of the expansion reservoir, wherein the inlet port is closed by the valve in a first switching position and open in at least one second switching position, thus allowing the inlet port to vent into the expansion reservoir.

By integrating a differential-pressure-controlled valve in the lid of the expansion reservoir, the inlet port can be closed in a first switching position and open in a second switching position. No coolant flows through the expansion reservoir in the first switching position, thereby allowing the coolant in the coolant circuit to rapidly heat-up during this phase. The inlet port is at least partially open in the second switching position of the valve, which is assumed when sufficient differential pressure exists between the interior of the expansion reservoir and the atmosphere, thus allowing the inlet connection to vent into the expansion reservoir. A coolant circuit, which can also be heated very quickly, can then be operated at a defined overpressure. The valve switches automatically between the first and second switching position. The coolant circuit is then also very safe to operate. When the lid is not screwed in, the coolant circuit can be easily filled via the expansion reservoir, because the valve is unable to close the inlet port. In addition, there is continuous venting during the filling operation. The expansion reservoir is preferably located at the highest geodetic point in the coolant circuit, so that gas bubbles rising in the coolant circuit can automatically travel to the inlet port and, depending on the switching position of the valve, into the expansion reservoir.

In a preferred embodiment, the lid can be screwed in to assume an intermediate position or an end position, wherein the inlet port is always open in the intermediate position. When the lid is screwed into an intermediate position, where the inlet port is always open, the coolant circuit can be vented very quickly via the inlet port without enabling coolant or gas to escape into the atmosphere through the fill opening. An internal combustion engine supplied with coolant from the coolant circuit can already be operated with a lid screwed into the intermediate position. When the lid is screwed deeper into the end position, the differential-pressure-controlled valve automatically controls venting of the inlet port into the expansion reservoir.

In a preferred embodiment, the valve can assume a third switching position where the expansion reservoir can vent to atmosphere. In the third switching position, the valve can vent the expansion reservoir into the atmosphere and thus equalize the pressure to protect the coolant circuit when the pressure difference between the expansion reservoir and the atmosphere is particularly high.

In a preferred embodiment, the valve has a spring-loaded, axially guided valve disk. A differential-pressure-controlled valve can then be produced in a particularly simple manner. The spring hereby acts against the pressure in the interior of the expansion reservoir. The differential pressures required to trigger the individual switching positions can be preset by suitably adjusting the spring characteristics.

In a preferred embodiment, the inlet port open radially to the valve disk, wherein the valve disk completely closes the inlet port in the first switching position and opens the inlet port in the second switching position. In the first switching position, the valve disk is at the height of the inlet port which opens radially to the valve disk, so that the inlet port is completely covered by the valve disk. When the spring of the valve disk is compressed by the differential pressure, the valve disk is axially displaced such that the inlet port is at least partially open and can vent. Since the inlet connection opens radially to the valve disk, the forces for actuating the valve can be kept small.

A differential pressure exists between the inlet port and the outlet port in a coolant circuit having the expansion reservoir according to the invention. In a preferred embodiment, the outlet port is in fluid communication with a coolant pump, wherein the coolant pump is constructed to draw cooling medium from the expansion reservoir. The inlet port is connected to the coolant circuit such that gas bubbles can travel from the coolant circuit to the expansion reservoir.

BRIEF DESCRIPTION OF THE DRAWING

Further details, features and advantages of the invention will become apparent from the following description of a preferred exemplary embodiment with reference to the drawings, which show in:

FIG. 1 an expansion reservoir with lid which is not screwed in;

DETAILED DESCRIPTION OF THE PREFERRED EMBODIMENTS

Figure 1:
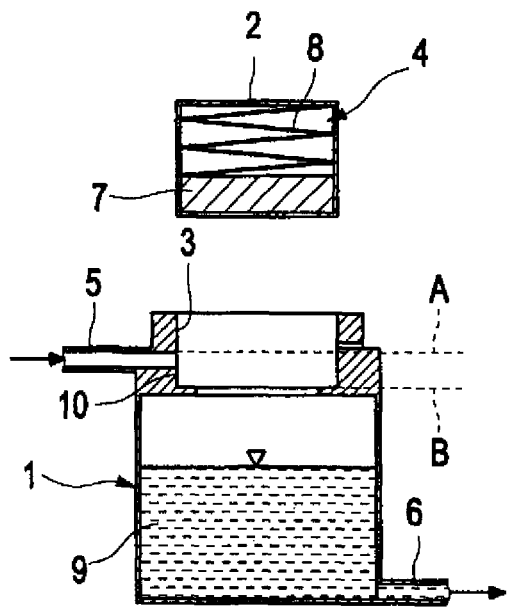

All FIGS. 1 to 5 have in common a fluid expansion reservoir 1, which is partially filled with coolant 9, forming an air cushion above the coolant 9. A lid portion 10 is located in a geodetically upper area of the expansion reservoir 1, with a fill opening 3 that can be closed by a lid 2. An inlet port 5 extends into the expansion reservoir 1 and opens into the lid region 10. The lid region 10 may preferably be formed as a cage-like structure with threads for receiving the lid 2. The inlet port 5 is in fluid communication with an unillustrated heat exchanger of a coolant circuit or with an unillustrated internal combustion engine incorporated in the coolant circuit, allowing gases and/or a coolant 9 to reach the expansion reservoir 1. The coolant 9 can reach an unillustrated coolant pump through an outlet port 6 arranged in a geodetically lower region of the expansion reservoir 1. A differential-pressure-controlled valve 4 with three switching positions is integrated in the lid 2. The valve 4 is composed of a valve disk 7, which is axially guided in the lid 2 and biased by a compression spring 8. The characteristic curve of the compression spring 8 hereby determines the differential pressure between fluid expansion reservoir 1 and the atmosphere that is required for assuming the respective switching position. In the fully screwed-in state, the valve disk 7 closes the inlet port 5, which radially opens to the valve disk 7, in the first switching position. The valve disk 7 opens the inlet port 5 in the second and third switching positions due to the compression of the spring 8.

FIG. 1 shows the expansion reservoir 1 with the lid 2 removed. The fill opening 3 is then permanently open, allowing the inlet port 5 and the expansion reservoir 1 to vent to the atmosphere. In this configuration, the expansion reservoir 1 and the coolant circuit connected thereto can be filled with a coolant 9.

Figure 2:
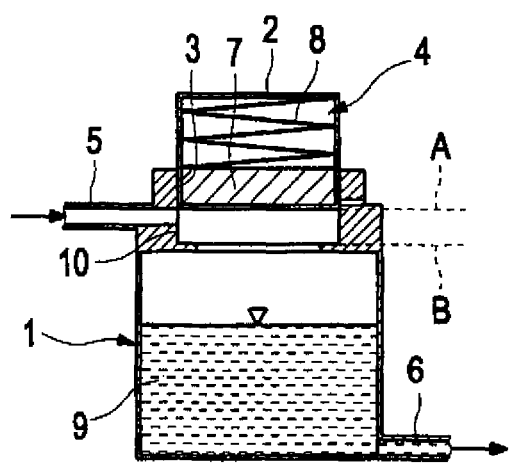
FIG. 2 an expansion reservoir with a lid which is screwed into the intermediate position.

FIG. 2 shows the expansion reservoir 1 with the lid 2 screwed into an intermediate position A. The inlet port 5 continues to be open in the intermediate position A, but the fill opening 3 is closed gas-tight. The inlet port 5 can thus vent permanently into the expansion reservoir 1, allowing the coolant circuit to vent particularly fast.

Figure 3:
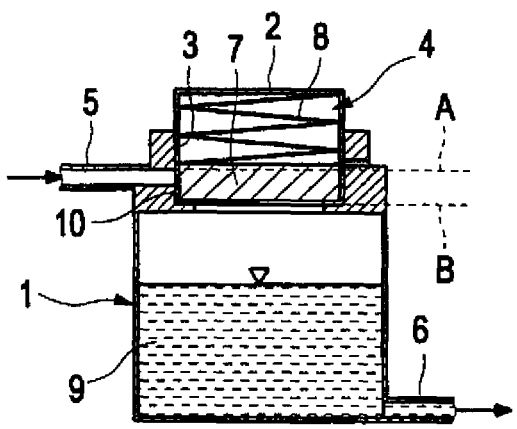
FIG. 3 an expansion reservoir with a lid which is screwed into the end position and a valve in the first switching position.

FIG. 3 shows the expansion reservoir 1 with the lid 2 screwed into the end position B. The differential pressure between the expansion reservoir 1 and the atmosphere is still low enough so that the valve disk 7 completely blocks the inlet port 5 in the first switching position. The coolant circuit is then unable to vent into the expansion reservoir 1, thus allowing the internal combustion engine to heat up particularly fast due to the absence of flow through the expansion reservoir 1.

Figure 4:
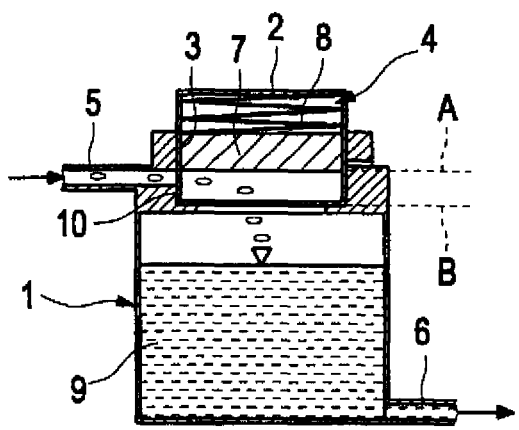
FIG. 4 an expansion reservoir with a lid which is screwed into the end position and a valve in the second switching position.

FIG. 4 shows the expansion reservoir 1 with the lid 2 screwed into the end position B. The differential pressure between the expansion reservoir 1 and the atmosphere has risen to a point where the spring 8 is compressed and the valve disk 7 at least partially opens the inlet port 5 in the second switching position. This allows the inlet port 5 to vent into the expansion reservoir 1.

Figure 5:
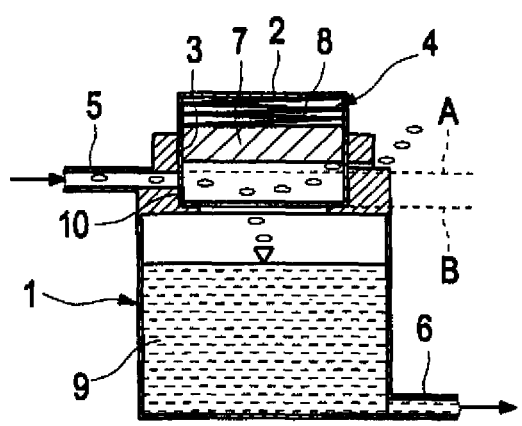
FIG. 5 an expansion reservoir with a lid which is screwed into the end position and a valve in the third switching position.

FIG. 5 shows the expansion reservoir 1 with the lid 2 screwed into the end position B. The differential pressure between the expansion reservoir 1 and the atmosphere has risen to such a level that the spring 8 is still further compressed and the valve disk 7 completely opens the inlet port 5 in the third switching position. In addition, the expansion reservoir 1 can vent via the lid 2 into the atmosphere. Damage to the coolant circuit caused by overpressure can thus be prevented.

The invention claimed is:

1. An expansion reservoir for a coolant circuit, comprising:
a fill opening located in a geodetically upper area of the expansion reservoir,
a lid constructed to close the fill opening and having a lid portion,
a differential-pressure-controlled valve having three switching positions and being integrated in the lid,
at least one inlet port that opens into the lid portion, and
an outlet port located in a geodetically lower area of the expansion reservoir,
wherein the inlet port is closed by the valve in a first switching position of the valve and open to the expansion reservoir in a second switching position of the valve, thereby allowing the inlet port to vent into the expansion reservoir, and wherein the inlet port is open to the expansion reservoir and via the lid to atmosphere in a third switching position of the valve.

2. The expansion reservoir of claim 1, wherein the lid assumes one of an intermediate position and an end position when screwed into the inlet port, wherein the inlet port is always open in the intermediate position.

3. The expansion reservoir of claim 1, wherein the valve comprises a spring-loaded axially guided valve disk.

4. The expansion reservoir of claim 3, wherein the inlet port opens radially to the valve disk, with the valve disk completely closing the inlet port in the first switching position of the valve and opening the inlet port in the at least one second switching position of the valve.

5. A coolant circuit with an expansion reservoir, the expansion reservoir, comprising:
a fill opening located in a geodetically upper area of the expansion reservoir, a lid constructed to close the fill opening and having a lid portion,
a differential-pressure-controlled valve having three switching positions and being integrated in the lid,
at least one inlet port that opens into the lid portion, and
an outlet port located in a geodetically lower area of the expansion reservoir,
an outlet port located in a geodetically lower area of the expansion reservoir which is closed by the valve in a first switching position of the valve and open to the expansion reservoir in a second switching position of the valve, thereby allowing the inlet port to vent into the expansion reservoir, wherein the inlet port is open to the expansion reservoir and via the lid to atmosphere in a third switching position of the valve, and
wherein a differential pressure exists between the at least one inlet port and the outlet port.

6. The coolant circuit of claim 5, wherein the outlet port is in fluid communication with a coolant pump.

* * * * *